A. L. NELSON.
OILING DEVICE FOR VALVE STEMS.
APPLICATION FILED AUG. 18, 1919.
1,370,346.
Patented Mar. 1, 1921.
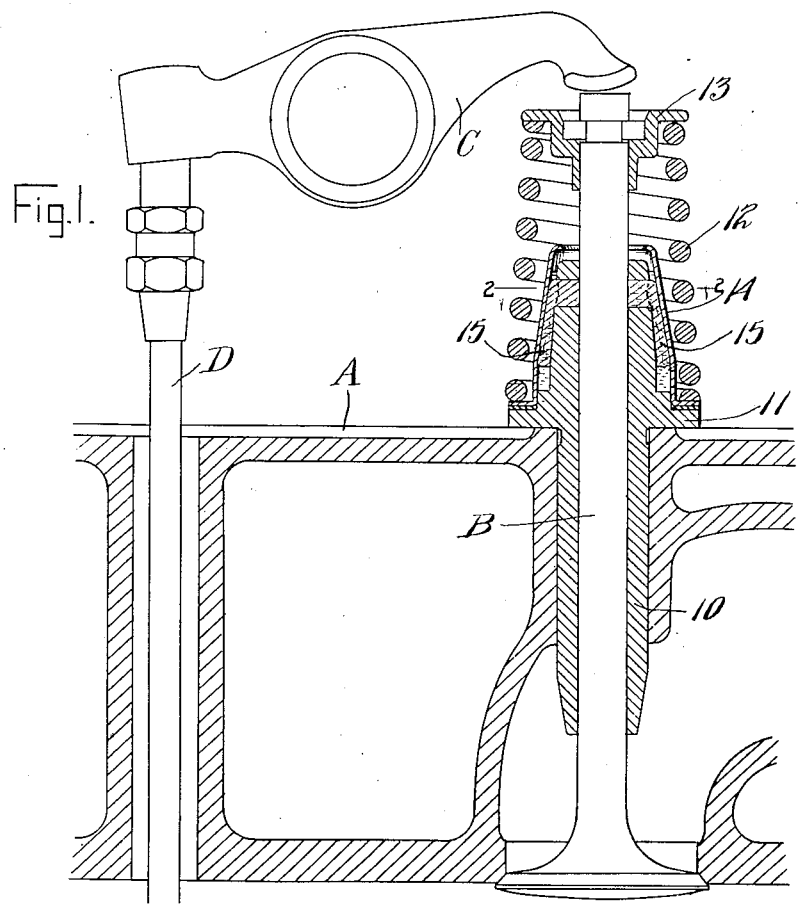
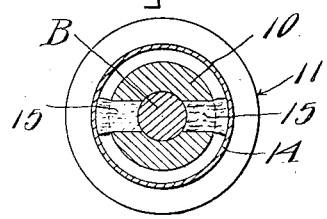
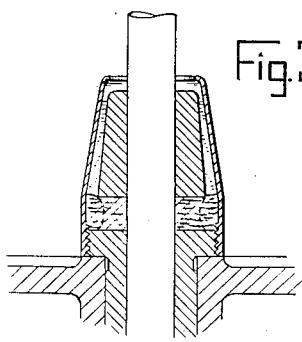
Inventor
Adolph L. Nelson
By
Attorney

UNITED STATES PATENT OFFICE.

ADOLPH L. NELSON, OF INDIANAPOLIS, INDIANA.

OILING DEVICE FOR VALVE-STEMS.

1,370,346. Specification of Letters Patent. Patented Mar. 1, 1921.

Application filed August 18, 1919. Serial No. 318,366.

*To all whom it may concern:*

Be it known that I, ADOLPH L. NELSON, a citizen of the United States, residing at Indianapolis, in the county of Marion and State of Indiana, have invented certain new and useful Improvements in Oiling Devices for Valve-Stems, of which the following is a specification.

The object of my said invention is to provide an oiling device for the valve stems of internal combustion engines whereby the oil may be applied to the surface requiring lubrication in a manner to prevent leakage or waste and the oil itself be maintained in a reservoir where it will be protected, all as will be hereinafter described and claimed.

Referring to the accompanying drawings which are made a part hereof and on which similar reference characters indicate similar parts;

Figure 1 is a sectional view through a portion of the head of a cylinder of an internal combustion engine of the "valve-in-the-head" type showing the parts associated with the valve stem, for the purpose of illustrating the use and operation of my said invention, Fig. 2, a cross section on the dotted line 2—2 in Fig. 1, and Fig. 3, a view similar to a portion of Fig. 1, showing a slightly modified form.

In said drawings the portions marked A represent the cylinder head, B the valve stem, C the rocker-arm, and D the operating rod, all of which are or may be of any appropriate construction or arrangement, and require no detail description herein.

The valve stem B is mounted to reciprocate along the bearing 10, which serves as a guide and which bearing is mounted in an appropriate aperture in the cylinder head. Said bearing extends both above and below the top of said cylinder head and is formed with a circumferential flange 11 which rests upon the cylinder head and is secured thereto in any appropriate manner. The valve spring 12 is interposed between said flange and the valve-spring retaining cap 13 secured on the upper end of the valve stem. The upper end of the bearing 10 is preferably tapered slightly from the flange 11 toward the top and is surrounded by an oil-retaining casing 14 preferably formed with an out-turned annular flange on its lower end which rests on a gasket interposed between said flange and the top of the flange 11 and may be held in place by the spring 12, as shown in Fig. 1, or may be formed internally screw-threaded, as shown in Fig. 3, and screwed on to a screw-threaded edge of a flange on the bearing 10. Said oil-retaining casing extends up to above the upper end of the bearing and is formed in-turned at its upper end. The bearing 10 is formed with transverse perforations near its upper end in each of which is mounted a hard felt wick 15, or a wick of any other appropriate material. Each wick is formed with a head extending through a perforation and a tail part which hangs down into the oil chamber to near the bottom thereof. In Fig. 3 I have shown the wick in perforations in the bearing near the lower end of the oil chamber and extending in a horizontal direction only, a modification that may be used if desired. While I have shown but two perforations and two wicks, it will be understood of course that only one or as many as may be desired, or found appropriate, may be used.

In use the casing 14 is filled with oil to a point near the upper end of the bearing 10, as indicated in Fig. 1, and the oil is taken up by the wick 15 and conducted to the surface of the reciprocating valve stem by capillary attraction, keeping said valve stem sufficiently lubricated to prevent wear and undue heating at this point.

By this means the oil is fed to the bearing in a manner to keep the valve thoroughly lubricated and at the same time prevent the oil from leaking into the cylinder.

Having thus fully described my said invention, what I claim as new and desire to secure by Letters Patent, is:

1. An oiling device for the valve stems of internal combustion engines of valve-in-the-head type comprising a casing surrounding the bearing on top of the cylinder and forming an annular oil chamber, and wicks extending through perforations in the bearing above the normal oil level in the oil chamber to the surface of the valve stem, substantially as set forth.

2. An oiling device for the valve stems of internal combustion engines of valve-in-the-head type comprising an annular casing secured around the upper end of the bearing and of a diameter somewhat larger than said bearing to form an oil chamber, said bearing being formed with transverse perforations above the normal oil level in the casing, and wicks mounted in said transverse perforations extending from contact with the valve stem downwardly into the oil in said oil chamber, substantially as set forth.

3. The combination with an internal combustion engine of a bearing for the valve stem extending through the head thereof and to a distance above said head, a casing surrounding the upper end of said bearing to form an oil chamber, and a wick leading from said oil chamber upwardly and through apertures in the bearing above the normal oil level in the oil chamber to said stem, substantially as set forth.

In witness whereof, I have hereunto set my hand and seal at Indianapolis, Indiana, this 12th day of July, A. D. nineteen hundred and nineteen.

ADOLPH L. NELSON. [L. S.]

Witnesses:
E. W. BRADFORD,
M. L. SHULER.